United States Patent [19]

Shimizu

[11] 4,378,130

[45] Mar. 29, 1983

[54] ROOF SIDE RAIL ASSEMBLY

[75] Inventor: Yoshiro Shimizu, Ayase, Japan

[73] Assignee: Isuzu Motors Ltd., Tokyo, Japan

[21] Appl. No.: 256,469

[22] Filed: Apr. 22, 1981

[30] Foreign Application Priority Data

Apr. 24, 1980 [JP] Japan .............................. 55/56336[U]

[51] Int. Cl.³ .............................. B60J 1/00; B60J 5/00
[52] U.S. Cl. .................................... 296/208; 296/146; 296/154
[58] Field of Search .............. 296/204, 201, 208, 206, 296/146, 154

[56] References Cited

U.S. PATENT DOCUMENTS

| | | | |
|---|---|---|---|
| 2,937,047 | 5/1960 | Hezler, Jr. et al. | 296/208 |
| 3,155,420 | 11/1964 | Belsky | 296/201 |
| 3,198,572 | 8/1965 | Stolarczyk | 296/201 |
| 4,284,304 | 8/1981 | Nakamura | 296/201 |

Primary Examiner—Richard A. Bertsch
Attorney, Agent, or Firm—Sughrue, Mion, Zinn, Macpeak and Seas

[57] ABSTRACT

A roof side rail assembly for an automotive vehicle in which a drip channel is formed continuously extending from in front of door opening to a rear portion above a rear side window. An outer rear periphery of a roof side rail member is positioned corresponding to an edge of a door frame member so that a drip channel is formed extending continuously therealong. A roof cover is secured to a rear side of the roof side rail member above the rear window with the outer surface of the roof cover having substantially the same configuration as an upper end surface of the door frame member.

6 Claims, 6 Drawing Figures

ROOF SIDE RAIL ASSEMBLY

BACKGROUND

The present invention relates to a roof side rail assembly of an automotive vehicle.

In a typical prior art automotive vehicle such as a coupe passenger car, a drip channel formed between a vehicle roof side rail above a door opening and the roof is covered by an upper peripheral edge of the door, when the door is closed, so that the roof is substantially flush with the upper peripheral edge of the door. In such a vehicle, since the configuration of the roof edge is associated with a glass opening configuration of a rear side glass, the configuration or assembly at the roof edge is intricate. This makes it difficult to mold that portion. Also, the upper construction of the vehicle body is complicated and difficult to assemble. This is also accompanied by problems in maintaining proper alignment among these components in assembling.

Also in such a construction, since the drip channel does not completely extend from the door opening end to the portion above the rear side window, rain water or the like can easily accumulate on the rear side window so that good visibility from the passenger compartment is not obtained. Also, special waterproofing measures are needed.

The discontinuity of the drip channel will be more specifically explained with reference to FIGS. 1, 1A, and 1B. FIG. 1 schematically shows a side view of a prior art coupe passenger car. FIGS. 1A and 1B show cross-sectional views of the car taken along lines A—A and B—B in FIG. 1, respectively. In FIG. 1A, a door frame 101 is constructed so as to project over a drip channel 102 formed integrally with a roof 103. If the drip channel 102 extends in a straight line to a position above a rear quarter window 104 as indicated by a phantom line 105, such a drip channel is displaced horizontally inwardly by a distance l from an upper end of the rear quarter window 104. The distance l corresponds to the width of the door frame 101. The rear side body has no member corresponding to the door frame 101. Therefore, the roof side member must be modified on the rear roof edge portion so that the outer periphery of the door frame 101 is flush with the rear roof side portion. This modification is very difficult in the panel molding process.

As a result, in the prior art assembly, there is no drip channel at the roof edge above the rear side glass as shown in FIG. 1B. This also leads to a poor drainage effect, poor visibility from the passenger compartment and the provision of special waterproofing measures. Thus, the structural difference between the rear roof edge portion and the front door roof edge portion as shown in FIGS. 1A and 1B is not desired.

Accordingly an object of the present invention is to provide an upper side assembly of an automotive vehicle, overcoming the above noted defects.

SUMMARY OF THE INVENTION

In accordance with this and other objects of the invention, there is provided a roof side rail assembly in which a first window is defined by a door frame member and the second window is defined by a roof side rail member on the rear side of the second window. A drip channel is formed between the roof of the vehicle and a roof side rail member with the drip channel being covered by an upper peripheral edge of the door so that a substantially flush surface is formed between the roof and the upper peripheral edge of the door. An outer rear periphery of the roof side rail member is positioned corresponding to an edge of the door frame member so that the drip channel extends continuously. The drip channel formed on a rear side of the roof side rail member is partially covered by a roof cover with an outer surface of the roof cover having substantially the same configuration as an upper end surface of the door frame member.

DESCRIPTION OF THE PREFERRED EMBODIMENTS

The present invention will now be described with reference to FIG. 2.

Figure 1:
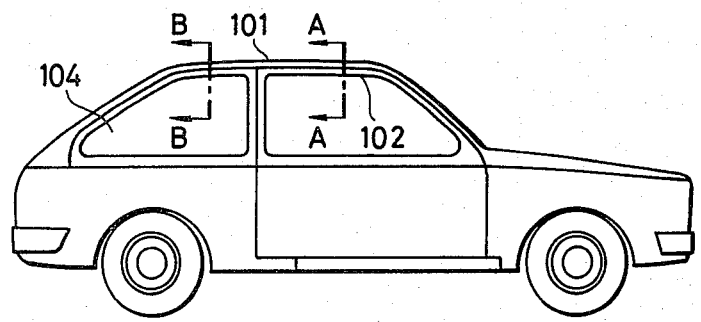
FIG. 1 is a schematic side view of a prior art coupe passenger car.
Figure 1A:
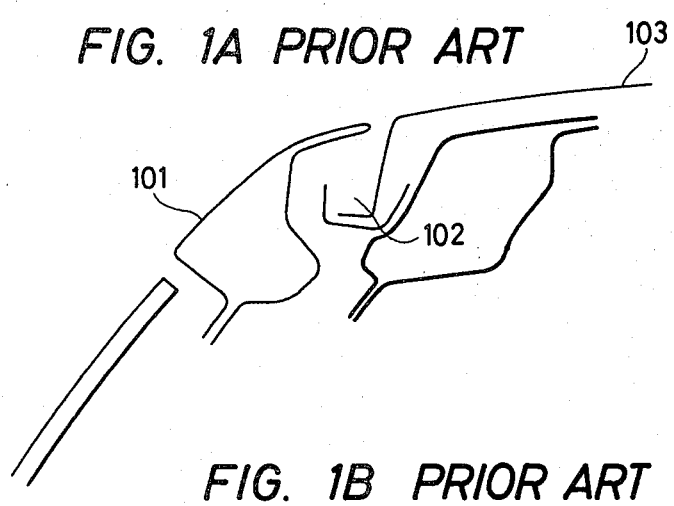
FIGS. 1A and 1B are cross-sectional views of this car taking along lines A—A and B—B in FIG. 1, respectively.
Figure 1B:
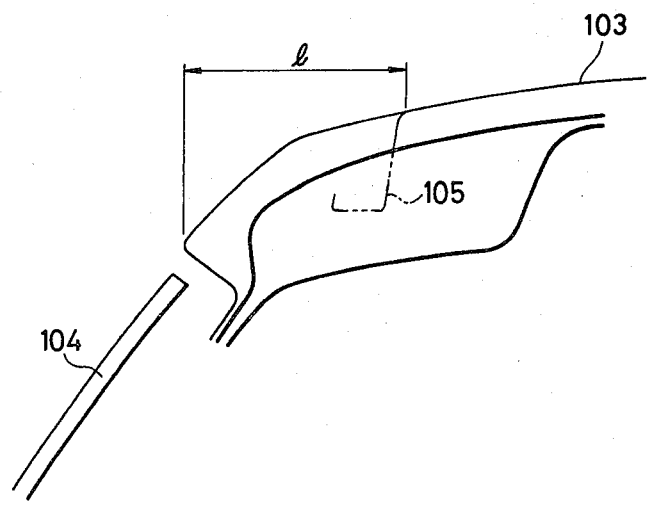
Figure 2:
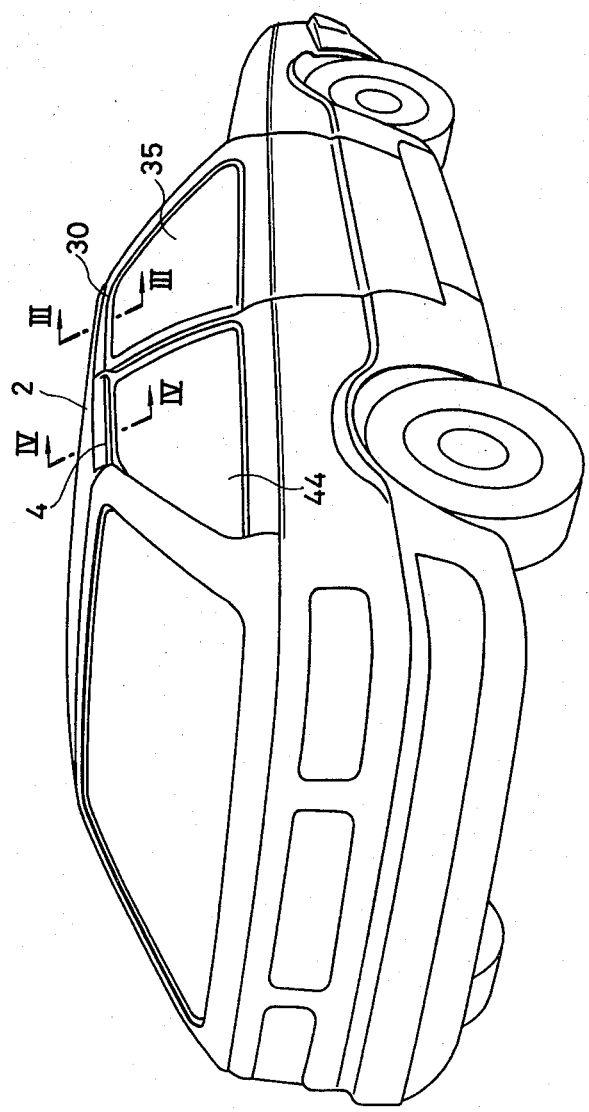
FIG. 2 is a perspective view of a coupe type vehicle body, as seen from the rear side, constructed in accordance with the invention.
Figure 3:
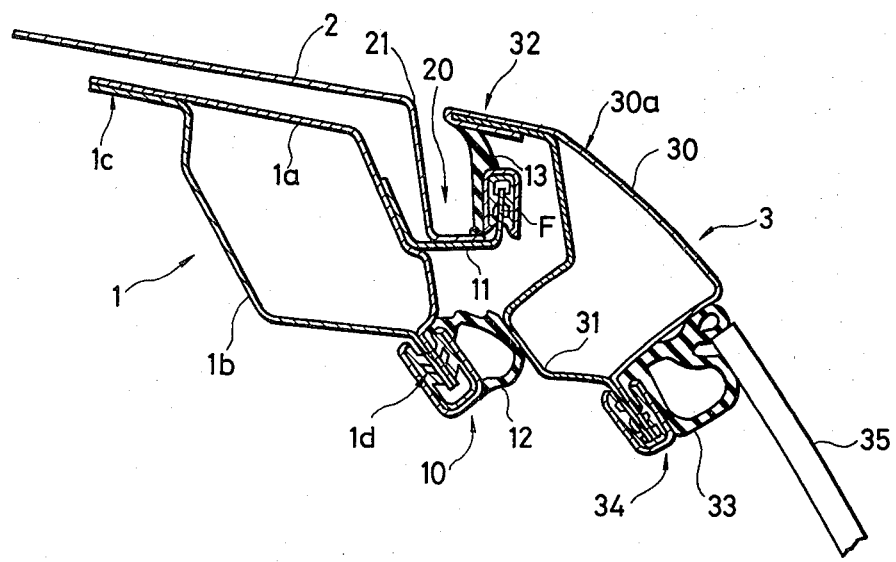
FIGS. 3 and 4 are cross-sectional views of the vehicle body of FIG. 2 taking along lines III—III and IV—IV, respectively.
Figure 4:
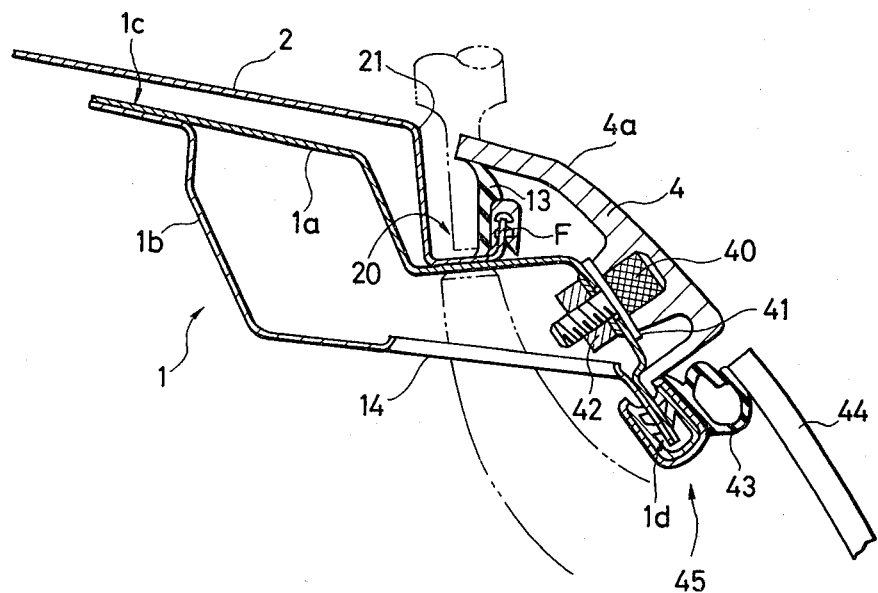

FIG. 2 shows a perspective view of a coupe type vehicle body, as seen from the rear side, constructed according to the invention. FIGS. 3 and 4 are cross-sectional views of the vehicle body taken along the lines III—III and IV—IV, respectively.

Reference numeral 1 denotes a roof side rail or cant rail which is composed of an outer plate 1a and an inner plate 1b having ends 1c and 1d. The roof side rail member has a hollow closed cross section. A first weather strip 12 is suitably mounted on the lower end 1d and constitutes an upper periperal edge of a door opening 10.

On the outer surface of the outer plate 1a is mounted a channel forming member 11 having a substantially vertical flange F. To a bottom of the channel forming member 11 is secured an L-shaped side edge of a roof 2 to thereby form a drip channel 20. A second weather strip 13 is mounted on the vertical flange F.

Reference numeral 3 denotes a door frame composed of an outer plate 30 and an inner plate 31. A part of an outer surface of the vehicle body is constituted by the outer plate 30. The outer surface of the vehicle body is flush with the outer plate 30. At an inside end of the inner plate 31, an edge of the outer plate 30 is folded back thereby forming a hemming 32 which forms the outer periphery of the door frame 3.

At the outer end of the outer plate 30 is formed an L-shaped flange to which the other end of the inner plate is weldingly secured. A third weather strip 33 is provided at the coupled portion to thereby form a door glass opening 34 which may hereinafter be referred to as a front window opening or a first window opening. The door frame 3 has a hollow cross section. In a well known manner, a door glass 35 is movably mounted in the door glass opening 34.

A U-shaped recess is formed in the inner plate 31 of the door frame on the passenger compartment side. When the door is closed, the hemming 32 defining the upper periphery of the door is located over a first or front portion of the drip channel 20 located above the door. A suitable slit is provided between the outer edge line 21 of the roof and the hemming 32. Sealing between the door and vehicle body is achieved with the weather strips 12 and 13. A substantially continuous surface is defined by the roof 2 and the outer surface 30a of frame 3. In the embodiment shown, the outer surface of the door glass 35 is also substantially flush with the outer surface 30a of the outer plate 30.

In FIG. 4, in the rear portion of the roof side rail member the inner side plate 1b has a much greater width than that shown in FIG. 3 so that an outer end 1d of the inner plate on the rear side is located at a straightly rearwardly extended position of the coupled end 34 forming the edge of the rear door glass opening or second window opening. An L-shaped recess is formed in an intermediate portion of the modified outer plate 1a. A peripheral edge of the roof 2 is weldingly secured to the wall of the recess. A second portion, or rear portion, of the drip channel 20 defined by the peripheral edge of the roof 2 has substantially the same configuration as the first portion, or front portion, of the drip channel. In the same manner as shown in FIG. 3, a weather strip 13 is mounted on the vertical flange F. Reference numeral 14 denotes an aperture through which welding operations can be carried out. The phantom lines in FIG. 4 indicate welding tool tips.

Thus, in the manner described, the first and second portions of the drip channel are in substantial alignment and the drip channel 20 is formed in substantially a straight line extending from the front side to the rear side of the vehicle.

On the outer plate 1a is mounted a roof cover 4 having substantially an L-shaped configuration in cross section. The roof cover 4 is molded of plastics. A suitable number of bolts 40 are implanted in the roof cover 4 and are inserted into associated apertures through washers 41. The bolts are secured by nuts 42 which may be inserted through the apertures 14. The roof cover 4 is adapted to cover in the same manner the drip channel 20 with a suitable overhang as shown in FIG. 4. The outer surface 4a of the roof cover 4 is formed so as to have substantially the same configuration as that of the outer surface 30a of the outer plate 30.

A weather strip 43 is mounted on the flange 1d of the roof side rail 1. In the specific embodiment described, an opening end 45 of a window glass 44 extending in the horizontal direction is formed by the weather strip 43. The outer surface of the window glass 44 is flush with the outer surface 4a of the roof cover 4.

In the assembly according to the present invention, the side edge configuration of the roof 2 is simplified and is easy to press. Namely, since the side edge of the roof 2 is formed in an L-shape on the rear side and in a U-shape on the front side, the configuration thereof is simple and readily press-molded.

The drip channel 20 extends integrally from the front side to the rear side on the vehicle roof side rail 1. Accordingly all collected rainwater or the like runs along the drip channel 20 and is guided and discharged toward the front side or the rearside without any of the defects inherent to the prior art assemblies in which the rainwater falls along the rear side window glss without restraint so that the view from the side of the passenger compartment is occluded. In the prior art assemblies, for this reason, a separate sealing structure is needed. According to the invention, good drainage effects are obtained and the view from the chamber side is enhanced.

In the assembly according to the invention, the roof cover 4 is mounted so as to cover the drip channel 20 and has a configuration similar to that of the front frame 3 so that the slot defined by the outer edge line 21 of the roof 2 and the outer edge 32 of the door and the edge line 21 and the roof cover 4 is continuous and extends straightly from the front side to the rear side of the vehicle. At the same time, the roof 2 and the outer surface 30a of the door frame 3 or the outer surface 4a of the cover 4 are substantially integral with each other. This leads to an aesthetically pleasing design appearance. In particular, the outer side portion of the vehicle is formed with a flush construction. This leads to a reduction of noise and aerodynamic resistance and hence to savings in fuel consumption.

In the specific embodiment, the roof cover 4 is made of plastics but it may of course be made of zink alloy or steel.

Other various modifications are possible within the scope set forth in the appended claims. For example, the invention is also applicable to an automotive vehicle having a side window construction separated into three sections. In such a vehicle, the rearmost window is often immovable. It is possible to apply the invention particularly to the upper side portion between the rearmost window and the middle door window.

What is claimed is:

1. In an automotive vehicle having a roof and a roof side rail member with said roof meeting said roof side rail member to form a drip channel, said vehicle further having a door having a door frame member with a first window opening formed therein, said first window opening being defined at an upper edge by an end portion of said door frame member, said door frame member having an upper peripheral portion and being movable between an open position and a closed position in which said upper peripheral portion partially covers said drip channel to form a substantially flush surface between said roof and upper peripheral portion of said door, said vehicle further having a body and a second window opening formed in said body adjacent said door, the improvement characterized in said roof side rail member includes a rear portion above said second window opening which extends away from said roof, said rear portion of said roof side rail member having an end portion at its outer end defining an upper edge of said second window opening and in substantial alignment with said flange portion of said door frame member.

2. An automotive vehicle as claimed in claim 1, the improvement further characterized in that said drip channel includes a first portion adjacent and above said first window opening and a second portion adjacent and above said second window opening, said first and second drip channel portions extending in substantial alignment with one another.

3. An automotive vehicle as claimed in claim 2, the improvement further comprising a roof cover member secured to said rear portion of said roof side rail member and partially covering said second portion of said drip channel.

4. In an automotive vehicle of the type having a vehicle body with a door opening and a rear window opening adjacent said door opening, said vehicle body having an outer surface, a door including a door frame member having a front window opening therein with a door glass being movable in said front window opening between open and closed positions, said door frame member being swingable between open and closed positions, the improvement comprising a roof side rail assembly comprising:

- a roof side rail having an outer plate and an inner plate joined at ends thereof with a hollow portion formed therebetween, said side rail extending continuously above both of said first and second window openings and said inner plate of said side rail having a rear portion adjacent and above said second window opening which has a greater width than a portion of said inner plate above said first window opening, said roof side rail outer plate having an L-shaped recess formed therein above said second window opening, said L-shaped recess having a wall;
- a first weather strip mounted on an end of said roof side rail to define an upper peripheral edge of said door opening;
- a channel forming member having a substantially vertical flange fixedly secured to said roof side rail above said first weather strip;
- said roof having an L-shaped side edge secured to said channel forming member to form a drip channel first portion and a peripheral edge of said roof being secured to said wall of said L-shaped recess in said side rail outer plate to form a drip rail second portion, said first and second drip channel portions extending in substantial alignment with one another;
- a second weather strip mounted on said vertical flange;
- said door frame member having a door frame inner plate having an inside end, an outside end and a U-shaped recess formed between said inside and outside ends, and a door frame outer plate having an edge and an outer end, said door frame outer plate being substantially flush with said vehicle body outer surface in the closed position of said door, said edge of said outer plate being folded over said inside end of said inner plate to form a hemming, said hemming forming an outer periphery of said door frame and partially covering said first portion of said drip channel in said closed position of said door, said outer end of said outer plate being formed as an L-shaped flange and secured to said outside end of said inner plate to form a hollow space therebetween;
- a third weather strip fixed to said L-shaped flange portion of said outer plate for sealing said door glass in its closed position;
- a roof cover of substantially L-shaped configuration and cross-section and covering said second portion of said drip channel above said second window opening, said roof cover being mounted on said outer plate of said side rail above said second window opening; and
- a fourth weather strip positioned above said second window opening and mounted on joined ends of said inner and outer plates of said side rail.

5. The roof side rail assembly of claim 4 wherein said inner plate of said side rail includes apertures therein for receiving therethrough welding tips for welding said roof to said outer plate of said side rail.

6. The roof side rail assembly of claim 5 wherein said roof cover is secured with bolts embedded therein, and nuts being positioned on said bolts through said apertures in said inner plate of said side rail.

* * * * *